United States Patent

[11] 3,596,917

[72] Inventor Henry F. Meyer
  Liverpool, N.Y.
[21] Appl. No. 799,608
[22] Filed Feb. 17, 1969
  Division of Ser. No. 309,700, Sept. 18, 1963,
  Pat. No. 3,316,629, division of Ser. No.
  614,483, Feb. 7, 1967, Pat. No. 3,466,971.
[45] Patented Aug. 3, 1971
[73] Assignee The Monarch Machine Tool Company

[54] TOOL ADAPTER
  13 Claims, 3 Drawing Figs.
[52] U.S. Cl. .................................................. 279/89,
  279/103
[51] Int. Cl. ....................................................... B23b 31/04
[50] Field of Search ........................................... 279/35, 37,
  76, 77, 78, 82, 84, 90, 91, 103, 1 A; 77/60, 71;
  90/11 A; 287/119

[56] References Cited
  UNITED STATES PATENTS
2,279,310 4/1942 Grey ............................ 279/78
2,461,579 2/1949 Thomas ........................ 279/76 X
2,996,302 8/1961 Haviland ....................... 279/103 X
3,380,746 4/1968 Benjamin ...................... 279/91

Primary Examiner—Andrew R. Juhasz
Assistant Examiner—Donald D. Evenson
Attorney—Woodling, Krost, Granger and Rust ABSTRACT: The tool adapter may be used in a tool holder of a machine tool and with adapter holding a tool which may be different. The tool holder has particular use with automatic tool changers to axially and rotatively lock the tool adapter in the tool holder by quick and positive action. The tool holder may be an operative rotating spindle in a machine tool. The tool holder includes a chuck receptacle having pivoted latch levers to engage a tool adapter groove with a recess formed by flats on the surface of the groove. The latch levers grip these recess flats to rotatively and axially lock the tool adapter in the chuck receptacle. The foregoing abstract is merely a resume of one general application, is not a complete discussion of all principles of operation or applications, and is not to be construed as a limitation on the scope of the claimed subject matter.

Patented Aug. 3, 1971
3,596,917
2 Sheets-Sheet 1
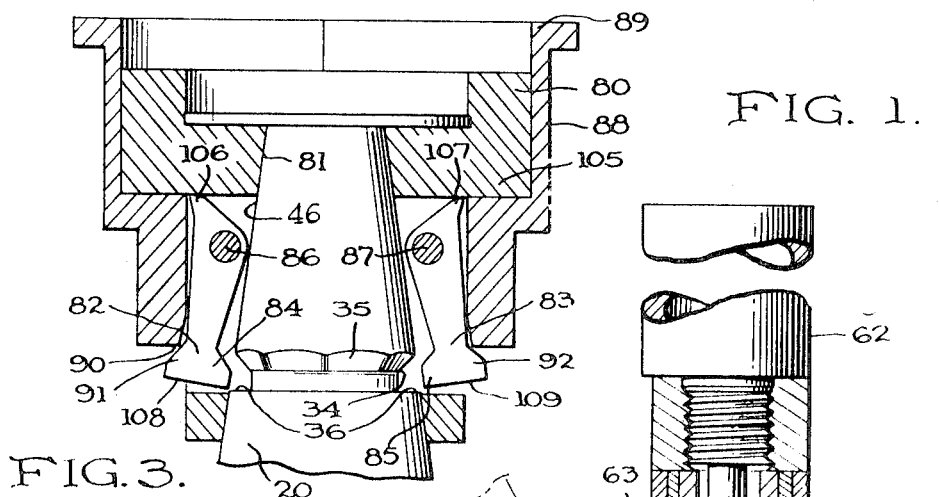
FIG. 1.
FIG. 3.
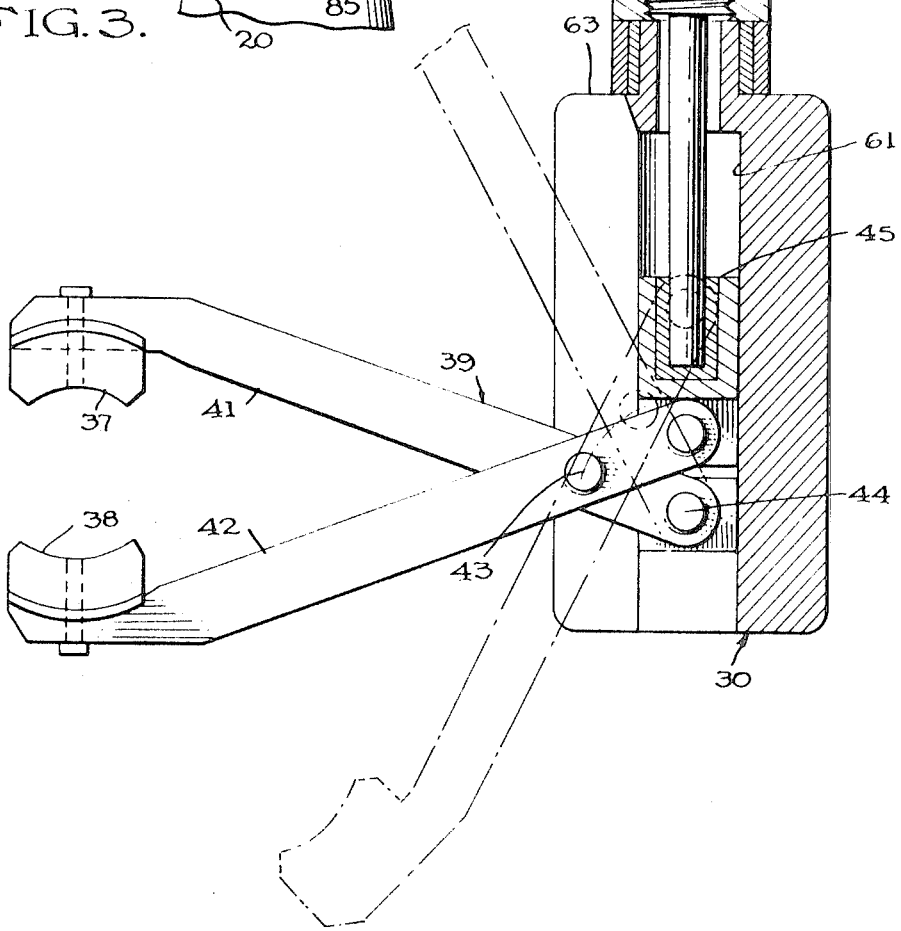
INVENTOR
HENRY F. MEYER
BY Woodling, Krost,
George and Rust
ATTORNEYS

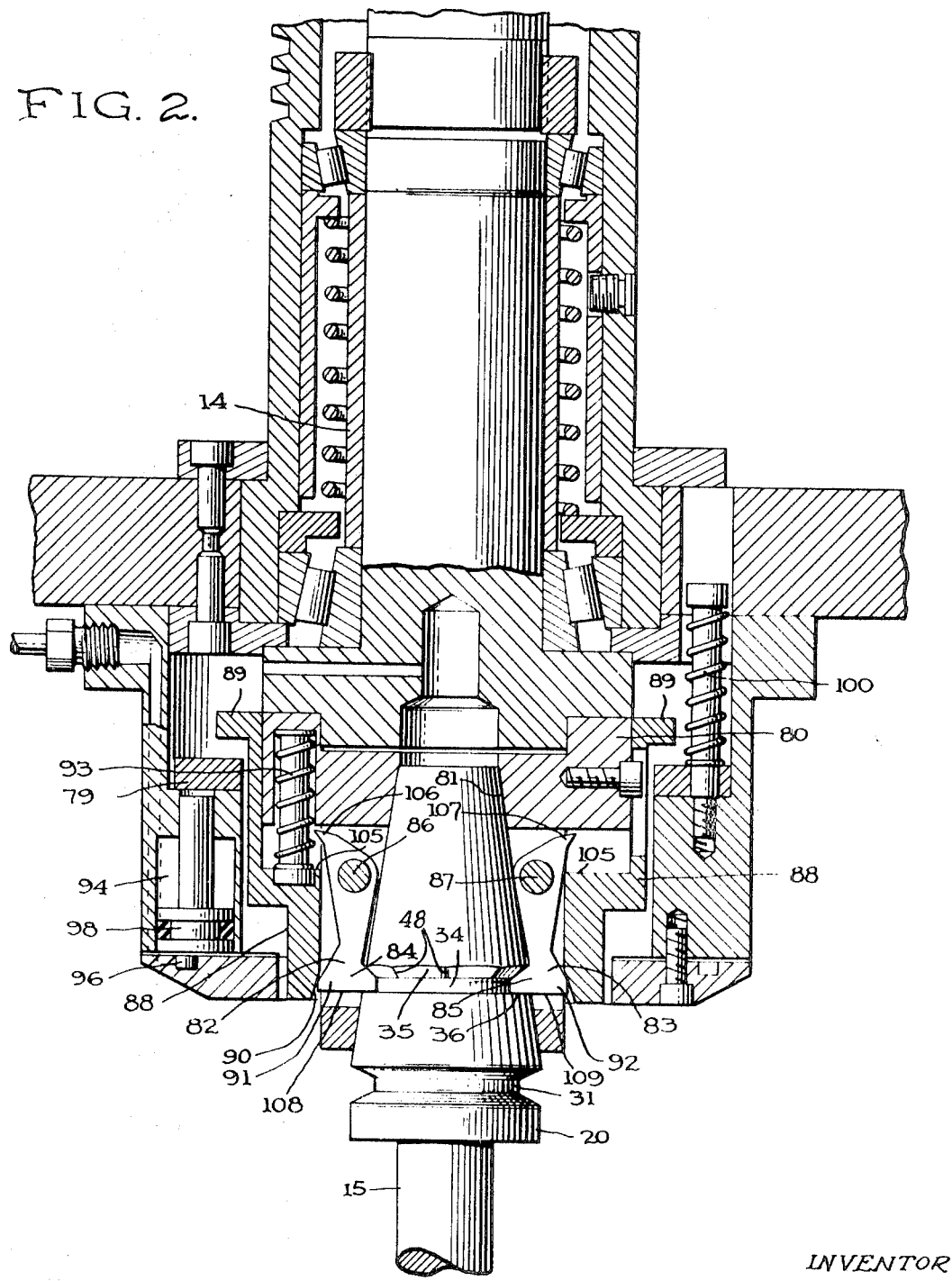

TOOL ADAPTER

RELATED APPLICATIONS

This application is a division of my application Ser. No. 309,700, filed Sept. 18, 1963, entitled "Machine Tool Tool Changer," now U.S. Pat. No. 3,316,629, issued May 2, 1967, and a division of my application Ser. No. 614,483, filed Feb. 7, 1967, entitled "Tool Holder" now U.S. Pat. No. 3,466,971.

SUMMARY OF THE INVENTION

The invention may be incorporated in a tool adapter for mounting a tool comprising in combination, a shank having tool receiving means thereon, the outer surface of said shank having a taper, a first groove in said shank for receiving carrying means for carrying said tool adapter, a second groove in said shank, said second groove having a plurality of locking surfaces with junction lines therebetween, said locking surfaces being closer to the axis of said shank than said junction lines to facilitate locking of the adapter in a chuck.

The present invention relates generally to machine tools and more particularly to an improved tool adapter usable with a tool change mechanism for changing a tool at the operating station of a machine.

In the present invention there is provided a tool adapter usable with a tool change mechanism readily adapted for automatic or programmed operation and which avoids the problem or manual insertion of tools while permitting rapid removal and insertion of tools at the operating station of a machine tool, such as a boring, tapping, milling or drilling machine.

Accordingly, it is a general object of the present invention to provide a machine tool equipped with an improved tool adapter mechanism.

Another object of the present invention is to provide an improved tool adapter for carrying a tool and adapted to be readily inserted and withdrawn in a rotary spindle of a machine tool without jamming.

In carrying out the present invention, in one embodiment thereof, the machine tool is equipped with a rotary spindle and a plurality of cutting tools adapted to be individually received by the spindle for rotation therewith to perform a machining operation. The cutting tools are mounted in tool adapters which are in turn stored in a turntable so that they may be moved in a circular path to locate the desired tool at a tool change station. At the tool change station, a mechanical tool changer may be operated to remove the desired cutting tool and adapter from the turntable and insert it into the spindle for performing the machining operation. During the machining operation, the tool changer is maintained clear of the cutting tool and spindle at the operating station. When demand is made for a new tool, the tool changer removes the tool from the spindle and replaces the cutting tool on the turntable. The turntable is indexed to bring the next tool, selected by demand, to the tool changing station where the tool change process is repeated.

In accordance with another feature of the present invention, each tool is mounted in a tool adapter. The tool adapter is tapered and is notched or grooved along the tapered surface to provide opposed oblique plane surfaces. The spindle is provided with a chuck receptacle having a matching taper to receive the tool adapter. The chuck receptacle is provided with a plurality of latches having opposed fitting surfaces which engage the opposed oblique surfaces of the tool adapter when it is inserted in the chuck receptacle to lock and drive the tool and its adapter in place.

While the specification concludes with claims particularly pointing out and distinctly claiming the subject matter regarding the present invention, it is believed that the invention will be better comprehended from the following description taken in connection with the accompanying drawings.

FIG. 1 is a partial plan and partial cross-sectional view of the tool transferring device; and FIGS. 2 and 3 are partial longitudinal sectional views of the spindle and adapter.

DETAILED DESCRIPTION

Reference is now made more particularly to the drawings which illustrate, with particularity, the features of the present invention. For convenience, and to avoid confusion, like parts of the various drawings have been identified with like numerals. FIG. 2 shows a rotatable spindle 14 that is adapted to carry a tool 15 to rotate with the spindle 14 for performing a machining operation. The spindle 14 is rotated in a well known manner by a motor (not shown) and by vertical movement in a downward direction causes the tool 15, when it comes in contact with the workpiece, to perform its machining operation.

In accordance with the present invention, the machine tool, illustrated in part in FIG. 1, is equipped with tool storage means for the various tools 15 which are securely mounted in tool adapters 20, the outer surface of which is conically tapered at 46. For providing a gripping means or surface for the tool change mechanism 30, the tool adapter 20 is notched or grooved along the tapered surface at 31, to facilitate gripping by the gripping surfaces or arms 37, 38 of tongs 39 of the tool change mechanism 30. A second groove 34 having a plurality of generally opposed oblique plane surfaces 35 is provided to facilitate operative locking and driving of the tool adapter and tool at the machine operating station or spindle 14.

Both grooves 31 and 34 are circumferential and extend around the periphery of the tapered surface 31, preferably being closer to one end of the tool adapter.

The opposed oblique plane surfaces 35, when the tool adapters 20 are locked in the spindle 14, serve to prevent rotation of the tool adapters 20 when the spindle 14 is rotatably driven and thus permit the tool 15 to be operatively driven and perform its work function. As more clearly shown in FIGS. 2 and 3, there may be provided matching pairs or a trio of oblique plane surfaces 35 which may be, for example, eight in number providing four pairs, or nine in number provided three trios. The tool change mechanism 30 is designed to operate the tongs 39 which are swung arcuately in a swinging plane containing the spindle axis and which open and close in various planes perpendicular to this swinging plane through the action of double acting air cylinder 61.

The tongs 39 are carried on a horizontally disposed rotatable shaft 62 which is carried between bearing or bracket plates 63.

Opening and closing of the tongs is effected through air cylinder 61. As more clearly shown in FIG. 1, tongs 39 which are manipulated to grasp the tool adapters 20 in the circumferential groove 31, include a pair of arms 41, 42 pivoted on a pin 43. The inner end of arm 41 is also pivoted on a pin 44 secured to shaft 62, while the inner end of arm 42 is affixed to the piston 45 of the air cylinder 61. Air is supplied to cylinder 61 from a suitable source (not shown), under control of a preselected program, and released through one side of cylinder 61 in a manner well known in the art. Forcing piston 45 in a direction against pin 44 causes arms 41 and 42 to close and grasp a selected tool adapter 20. When piston 45 is moved to the uppermost position in cylinder 61, arms 41 and 42 are drawn apart to their outermost extremities to provide clearance for the machining operation.

To effect placement of the selected tool 15 in the spindle 14, the rotatable shaft 62 is rotated from the tool storage magazine to place the adapter 20 in the spindle 14.

For locking the tool adapter 20 and tool in the machine tool in preparation for a machine operation, spindle 14, referring to FIGS. 2 and 3, is provided with a chuck receptacle 80 having an open face at one axial end machined to provide a steep or self-releasing taper 81 which is complementary to the taper surface 46 of tool adapter 20.

Referring to FIG. 2, there is shown a vertical cross-sectional view through the axis of the machine tool spindle comprising the spindle 14 mounted within a spindle sleeve. Within spindle 14 is mounted the chuck receptacle 80 adapted for receiving the tool adapter 20. At the lower extremity of chuck receptacle 80 is provided locking means, namely a plurality shown as a pair of latches 82, 83 having extending flange portions 84, 85, respectively which engage the groove 34 of tool adapter 20 when the adapter 20 is inserted into the chuck receptacle 80. The latches 82 and 83 are locking levers and are pivoted at an intermediate point thereof on centers at 86 and 87, respectively, which permit them to be suspended pendulumlike and enter the groove 34. A locking member 88 moves generally parallel to the chuck axis and is shown as a tubular collar 88 having a flange 89. Collar 88 surrounds the chuck receptacle or driven spindle part 80 and is mounted for movement thereon along the axis of the chuck receptacle 80. The inner lower end of the collar 88 is chamfered as at 90 at a small angle to provide a self-holding taper when collar 88 moves in a first axial direction engaging the outer locking surfaces 91, 92 of the first or free ends of latches 82, 83 respectively, and force the matching portions of opposite latches into the groove or recess 34 of the tool adapter 20, so as to cause the free ends of latches 82 and 83 to bear against the oblique plane surfaces 35, thus locking the tool adapter 20 and tool 15 against turning in the spindle adapter 80. The locking collar is urged in the downward or locked position by spring 93 as part of a motive or biasing means.

The locking means 82, 83 is provided with a locking face which has a component facing radially and axially inwardly. This may be at about a 45° angle relative to the chuck axis. In the locked position, this locking face of each latch lever 82, 83 engages a single locking surface or oblique plane surface 35. There are a plurality of such locking surfaces 35 with junction lines 48 therebetween, with the locking surfaces 35 closer to the axis of the spindle 14 than the junction lines 48. The junction lines 48 are extensions of lines passing through the axis. This establishes the rotational locking of the adapter 20 in the spindle 14 when the latches 82, 83 engage these locking surfaces 35. In this preferred embodiment the surfaces 35 are plane surfaces which are flat, and are part of the surface means defining a recess in the conical periphery 46 of the adapter 20. Any one of the flats 35 may be engaged by the locking face of the respective locking or latch lever, and thus only a single surface is so engaged. This engagement establishes a locking face to lock the adapter both rotationally and axially in the tool holder chuck receptacle 80. The flats 35 are part of the surface defining the groove 34, and have a component facing axially and radially outwardly.

For moving the collar 88 in a second axial or unlocking direction to permit removal of the tool adapter 20 from the spindle 14, there are provided in the motive or biasing means several fluid cylinders 94, only one of which is shown, which act against a ring 79. Ring 79 acts against the flange 89 of collar 88 to overcome the downward holding force of spring 93. When collar 88 is pushed upwardly, surface 105 bears against the extending heels 106, 107 on the second ends of latches 82 and 83, respectively, so as to force the free ends of the latches out of the groove 34. Simultaneously, the lower or release faces 108, 109 of latches 82 and 83, respectively, bear against the surface 36 of the groove 34 to push the tool adapter 20 downwardly a small distance to assure that the tapers 46 and 81 are separated so as to facilitate removal of the tool adapter from the spindle.

In removal of a tool 15 and its adapter 20 from the spindle 14 and transporting it to the tool storage magazine the end gripping surfaces or members 37, 38 of tongs 39 are caused to move inwardly through the action of air cylinder 61 in a manner hereinbefore described and grip the tool adapter 20 at the groove 31. Immediately thereafter, in accordance with a preselected program control, through port 96 which is located beneath the head of cylinder 94, air is admitted under pressure. Cylinder 94, and other cylinders not shown, when actuated or energized cause their corresponding pistons to raise and overcome the force of spring 100. Continued motion of piston 98 causes engagement with flange 89 thus raising collar 88 until the chamfered surface 90 clears the outer surfaces 91, 92 of latches 82, 83 causing them to be forced outwardly in a manner hereinbefore described. Thus, tool adapter 20 is freed for removal from the chuck receptacle 80 as shown in FIG. 3.

From the foregoing description, it is apparent that there has been provided a tool change mechanism for rapidly and automatically changing tools in a machine tool which is economical in construction and simple in operation and yet provides desired reliability in that it reduces the problems of jamming on separation of the tool from its holder. To this end, there is provided tool storage means wherein the tools are mounted in tool adapters and stored in a matrix on a turntable. The turntable is selectively indexed in order to bring the tools and adapters into position to be selectively captured by tool selection means and moved out of the tool storage means. The tool and adapter are swung through an arcuate path to be positioned within a tool spindle and fastened therein for a machining operation. By reversing the process, the tool and adapter may be rapidly returned to its storage position.

The present disclosure includes that contained in the appended claims as well as that of the foregoing description. Although this invention has been described in its preferred form with a certain degree of particularity, it is understood that the present disclosure of the preferred form has been made by way of example and that numerous changes in the details of construction and the combination and arrangement of parts may be resorted to without departing from the spirit and the scope of the invention as hereinafter claimed.

What I claim is:

1. A tool adapter for mounting a tool comprising in combination, a shank having tool receiving means thereon,
    the outer surface of said shank having a taper,
    gripping means on said shank for receiving carrying means for carrying said tool adapter,
    a circumferential groove in said shank,
    said groove having a plurality of locking surfaces with junction lines therebetween,
    said locking surfaces being closer to the axis of said shank than said junction lines to facilitate locking of the adapter in a chuck.

2. The tool adapter as set forth in claim 1, wherein said first groove is circumferential.

3. The tool adapter as set forth in claim 1, wherein said tool receiving means is a central bore in the shank arranged for receiving a tool therein.

4. The tool adapter as set forth in claim 1, wherein said taper on said shank is a conical taper.

5. The tool adapter as set forth in claim 4, wherein said conical taper is a self-releasing taper to permit ready release of the shank from a chuck.

6. The tool adapter as set forth in claim 1, wherein said first and second grooves are longitudinally spaced.

7. The tool adapter as set forth in claim 1, wherein said groove is on a smaller potion of the taper shank than said gripping means.

8. The tool adapter as set forth in claim 6, wherein said first and second grooves are located nearer the larger portion than the smaller portion of the taper shank.

9. The tool adapter as set forth in claim 1, wherein said locking surfaces are planar surfaces.

10. A tool adapter as set forth in claim 1, wherein said locking surfaces are disposed at an angle to both the axis of the shank and a plane normal to said axis.

11. The tool adapter as set forth in claim 1, wherein said locking surfaces are oblique plane surfaces with the junction lines therebetween being extensions of lines passing through the axis of the shank.

12. The tool adapter as set forth in claim 1, wherein said gripping means is a first groove, and the groove having the locking surfaces is a second groove.

13. The tool adapter as set forth in claim 1, wherein said locking surfaces face radially outwardly and axially.